Sept. 24, 1935.  R. W. ELLINGHAM  2,015,339

METHOD OF MAKING A HOLE SAW

Filed June 3, 1931

Inventor
Robert W. Ellingham

Patented Sept. 24, 1935

2,015,339

UNITED STATES PATENT OFFICE 2,015,339

METHOD OF MAKING A HOLE SAW

Robert W. Ellingham, Springfield, Mass., assignor to The Black & Decker Manufacturing Company, Towson, Md., a corporation of Maryland Application June 3, 1931, Serial No. 541,808

3 Claims. (Cl. 76—112)

The invention relates to a method of making a hole saw, i. e., a saw having a toothed edge in the shape of a ring adapted to be operated by means of a rotary tool as a portable drill. The hole saw is rotated about the axis to form a circular cut concentric with and disposed in the direction of the axis. It is used for cutting holes in sheet metal, but is capable of somewhat more general application.

The previous practice in the production of hole saws has been first to make a cup shaped member formed of high speed steel by drawing and then to cut the saw teeth on or in the rim of the cup. This method or production is expensive on account of the necessity for making the complete tool from expensive material and also because this material is difficult to work in this way.

Another method of production is to make up a ring saw blade out of a strip of high speed tool steel or other suitable material and then to mount it in a groove in a special head or block. The hole saw produced in this way is limited as to the depth of cut on account of the slight extent to which the saw blade projects from the head.

The object of the present invention is to produce a hole saw which has all the advantages of the one piece cup saw produced from high speed tool steel and to eliminate the disadvantages of this product by making the cup of relatively cheap and easily workable material as cold rolled stock and the edge or blade on which the teeth are formed of high speed or special alloy steel. In this way the tool is produced at greatly reduced expense of both material and labor.

To complete the tool in accordance with the preferred practice of the invention, the ends of the strip of high speed tool steel forming the blade ring are welded together, the tool steel blade is welded to its seat in the edge of the cup and the inside and outside surfaces of the cup and blade are finished so that the completed hole saw has the appearance and the operative qualities of the more expensive product made entirely of high speed steel produced in accordance with the previously existing practice as originally outlined.

In the accompanying drawing I have illustrated a hole saw constructed in accordance with the method of my invention, the illustration disclosing the saw and the parts thereof in the form which they take in the various stages of production in accordance with the method of the invention.

Figure 1:
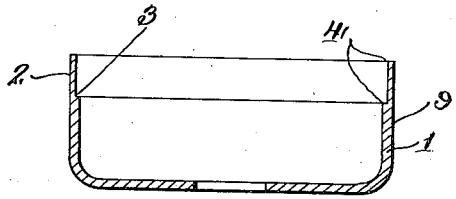
Figure 1 is a vertical diametrical section showing the cold rolled steel cup ready to receive the blade.
Figure 6:
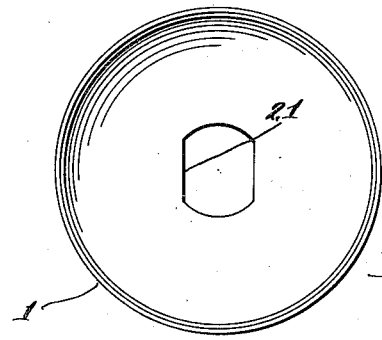
Figure 6 is a plan view of the cup.
Figure 2:
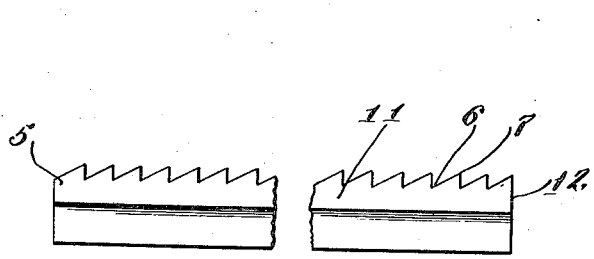
Figure 2 is an elevation of the blade strip developed or laid straight and broken away at the center.
Figure 3:
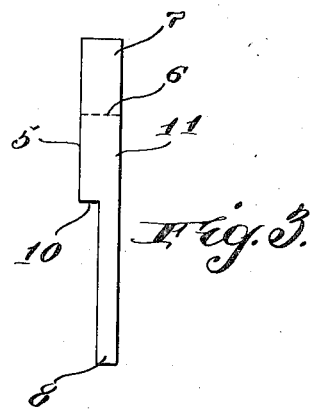
Figure 3 is an end elevation of the same on an enlarged scale.
Figure 5:
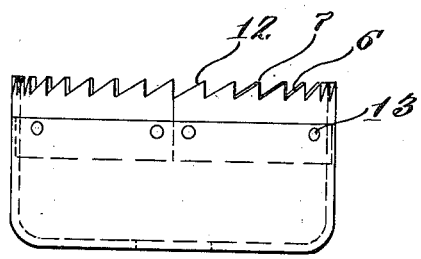
Figure 5 is a side elevation of the completed hole saw, the contacting surfaces where the metal is joined and the inside surface of the cup, etc. being shown in dotted lines.
Figure 4:
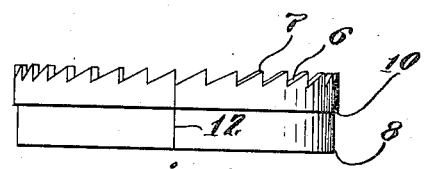
Figure 4 shows the blade strip formed into a ring ready for insertion in the cup.

Referring to the drawing by numerals, each of which is used to indicate the same or similar parts in the different figures, the illustration includes a cup 1, which is drawn or spun from cold rolled stock in accordance with the regular practice in the art of rolling and spinning sheet metal. This cup is of reduced thickness as to the peripheral edge portion at 2, the outside surface being continuous and the inside surface near the edge of the cup being rabbeted or shouldered at 3 to form a circumferential seat 4 for the blade 5, Figures 2 and 3. This cup has an arbor hole of the usual form at 21 for mounting the saw so that it may be driven by a rotary tool or from any suitable source of power.

The blade member, as already described, is formed of high speed alloy steel or other material suitable to the formation of cutting tools. The blade member 5 is notched at 6 to form the cutting teeth 7 and the toothed edge portion 11 is of a thickness exceeding that of the opposite edge portion at 8, being preferably of a thickness equal to that of the walls of the cup at 9 beyond the shoulder 3, and the blade strip is formed with a longitudinal shoulder 10 at the edge of the thickened or toothed portion 11 where it is stepped down to the thickness of the portion 8. The blade strip 5 is then bent to form a ring, the ends 12 being brought together. The shoulder 3 of the cup being preferably on the inside, the blade ring is correspondingly formed, i. e., of complementary arrangement with the shoulder on the outside.

The reduced edge 8 is then inserted in the cup, fitting into the rabbeted seat 4, the ends 12, 12 of the ring are welded together and the ring is spot welded to the cup at five or six or at any suitable number of points indicated by reference character 13. The tool is later finished to form a smooth continuous surface outside and in, giving the appearance of a tool formed by drawing from a single piece of stock, and having not only the appearance but the operative qualities of a hole saw manufactured by drawing from high speed steel in accordance with the previously existing practice. The product produced in accordance with the method described is much cheaper than that previously made, entirely of tool steel, not only on account of the saving in material due to the substitution of cold rolled sheet metal for high speed alloy steel, but also on account of the greater ease with which sheet steel may be drawn as compared to the more expensive tool steel.

I have thus described specifically and in detail the method of making a hole saw in accordance with my invention and the hole saw in the preferred form produced in the practice of the method, the description being specific and in detail in order that the method of the invention and the manner of practicing and applying and using the same, and the construction of the tool may be clearly understood, however, the specific terms herein are used descriptively rather than in a limiting sense, the scope of the invention being defined in the claims:

What I claim as new and desire to secure by Letters Patent is:

1. The method of constructing a hole saw which consists in forming a cup by drawing from cold rolled stock, rabbeting the edge of the cup to form a circumferential seat, forming a saw blade of a strip of high speed steel, the strip having a toothed edge, and a rabbeted edge, bending the blade in the form of a ring and inserting the rabbeted edge of the blade in the seat formed in the cup, and securing the blade to the cup.

2. The method of constructing a hole saw which consists in forming a cup by drawing from cold rolled stock, rabbeting the edge of the cup to form a circumferential seat, forming a saw blade of a strip of high speed steel, the strip having a toothed edge and a rabbeted edge, bending the blade in the form of a ring and inserting the rabbeted edge of the blade in the seat formed in the cup, welding the ends of the blade together, spot welding the blade to the cup and finishing the inner and outer surfaces of the blade and cup to form continuous outer and inner surfaces.

3. The method of making a hole saw which consists in forming a cup of relatively soft metal, the band having saw teeth on one edge and having the other edge rabbeted to fit the rabbeted edge of the cup with a rabbeted peripheral edge providing a circumferential seat forming a substantially straight band of tool steel, forming the band into a rigid ring by bending it in a circle and securing the ends together, fitting the rabbeted edges of the band and cup together to present a smooth inner and outer surface and permanently securing an edge of the ring band to the edge of the cup forming a rigid construction with a permanently circular edge.

ROBERT W. ELLINGHAM.